US008260259B2

(12) United States Patent
Semple et al.

(10) Patent No.: US 8,260,259 B2
(45) Date of Patent: Sep. 4, 2012

(54) MUTUAL AUTHENTICATION WITH MODIFIED MESSAGE AUTHENTICATION CODE

(75) Inventors: James Semple, London (GB); Gregory G. Rose, San Diego, CA (US); Michael Paddon, Kellyville (AU); Philip Michael Hawkes, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 1241 days.

(21) Appl. No.: 11/218,832

(22) Filed: Sep. 2, 2005

(65) Prior Publication Data

US 2006/0079205 A1      Apr. 13, 2006

Related U.S. Application Data

(60) Provisional application No. 60/608,424, filed on Sep. 8, 2004.

(51) Int. Cl.
*H04M 1/66* (2006.01)
*H04M 1/68* (2006.01)
*H04M 3/16* (2006.01)

(52) U.S. Cl. ........ 455/411; 370/389; 370/458; 370/254; 370/459; 370/441; 370/392; 370/255; 713/182; 713/1; 713/169; 713/168; 713/190; 713/170; 726/27; 726/3; 726/2; 726/14; 726/9; 726/34; 455/558; 455/404.1; 455/436; 455/450; 455/456.1

(58) Field of Classification Search ............. 370/389, 370/458, 254, 459, 437, 441, 392, 255; 455/451, 455/426, 411, 410, 404.1; 709/209, 229; 711/154, 114, 170, 193, 162, 163, 103; 379/62; 726/27, 3, 2, 14, 28, 20, 16, 9, 26, 34; 713/182, 713/1, 169, 168, 190, 170
See application file for complete search history.

(56) References Cited

U.S. PATENT DOCUMENTS 5,633,858 A * 5/1997 Chang et al. .............. 370/255
(Continued)

FOREIGN PATENT DOCUMENTS

EP          1209934 A     5/2002
(Continued)

OTHER PUBLICATIONS

"Universal Mobile Telecommunications System (UMTS)"; 3 G Security; Security Architecture (3GPP TS 33.102 version 3.6.0 Release 1999); ETSI TS 133 102: ETSI Standards, European Telecommunications Standards Institute, Sophia-Antipo, FR, vol. 3-SA3, No. V360, Oct. 2000.

(Continued)

*Primary Examiner* — Rafael Pérez-Gutiérrez
*Assistant Examiner* — Joseph Arévalo
(74) *Attorney, Agent, or Firm* — Kam Tam; Kristine U Ekwueme

(57) ABSTRACT

Methods and devices for instructing a subscriber identity module in a cellular communications network to process non-standard authentication information in a standard manner are disclosed. One embodiment of a method comprises receiving a first message authentication code (MAC) and an authentication management field (AMF) at a subscriber identity module as part of an authentication protocol, calculating a second MAC and determining whether the second MAC is equivalent to the first MAC. If the first and second MAC are not equivalent, the SIM calculates a third MAC and determines whether the first MAC is equivalent to the third MAC, and if so, the subscriber identity module processes the AMF in a predefined or standard manner.

15 Claims, 7 Drawing Sheets

U.S. PATENT DOCUMENTS

| | | | |
|---|---|---|---|
| 7,669,052 B2 * | 2/2010 | Asano et al. | 713/167 |
| 2001/0009023 A1 * | 7/2001 | Kikuchi et al. | 711/114 |
| 2002/0025037 A1 * | 2/2002 | Sano | 380/44 |
| 2002/0051537 A1 * | 5/2002 | Rogaway | 380/46 |
| 2002/0087814 A1 * | 7/2002 | Ripley et al. | 711/154 |
| 2002/0087818 A1 * | 7/2002 | Ripley et al. | 711/164 |
| 2002/0129245 A1 * | 9/2002 | Cassagnol et al. | 713/168 |
| 2002/0178358 A1 * | 11/2002 | Perkins et al. | 713/169 |
| 2003/0189905 A1 * | 10/2003 | Lee | 370/254 |
| 2004/0078571 A1 * | 4/2004 | Haverinen | 713/168 |
| 2004/0093507 A1 * | 5/2004 | Courcambeck et al. | 713/193 |
| 2005/0033960 A1 * | 2/2005 | Vialen et al. | 713/170 |
| 2005/0123025 A1 * | 6/2005 | Sorrells et al. | 375/130 |
| 2005/0135624 A1 * | 6/2005 | Tsai et al. | 380/270 |

FOREIGN PATENT DOCUMENTS

| | | |
|---|---|---|
| GB | 2356530 A | 5/2001 |
| WO | WO 02073928 A1 * | 9/2002 |

OTHER PUBLICATIONS

3GPP TS 33.220—3rd Generation Partnership Project; Technical Specification Group Services and System Aspects; Generic Authentication Architecture (GAA); Generic Bootstrapping Architecture (Release 6), 3GPP is 33.220 V6.0.0, Mar. 2004, pp. 1-18, XP002334596.

3GPP TS 33,220 V7.0,0. Generic Authentication Archer (GAA), Generic Bootstrapping Architecture. Release 7. (Jun. 2005).

3GPP Technical Specification Group Services and System Aspects: 3G Security, Security Architecture (Release 6) 3GPP TS 33102. V6.3.0 (Dec. 2004).

30 TS 33.102 V3.3,1, 3gpp, Technical Specification Group: Services and System Aspects, 3G Security, Security Architecture, (Release 1999) Jan. 14, 2000.

International Search Report & Written Opinion, PCT/US2005/032349, International Search Authority—European Patent Office—Feb. 21, 2006.

* cited by examiner

US 8,260,259 B2

MUTUAL AUTHENTICATION WITH MODIFIED MESSAGE AUTHENTICATION CODE

CLAIM OF PRIORITY UNDER 35 U.S.C. §119

The present Application for patent claims priority to Provisional Application No. 60/608,424 entitled "MODIFYING THE MAC TO INDICATE A STANDARDIZED AUTHENTICATION MANAGEMENT FIELD IN AKA", filed on Sep. 8, 2004, and assigned to the assignee hereof and hereby expressly incorporated by reference herein.

BACKGROUND

1. Field

The present invention relates generally to authentication in mobile communication networks, and more particularly to the use of authentication data to indicate an instruction.

2. Background

Mobile communication applications generally share a need for mutual authentication between a communications server and a subscriber (user equipment or mobile station) before communication is initiated. One authentication mechanism is based on a secret shared between the communicating entities, and there are numerous authentication protocols that rely on this pre-shared secret. Exemplary protocols relying on a preshared secret include HTTP (Hypertext Transport Protocol) Digest, IKE (Internet Key Exchange), and mechanisms based on username and password.

The mobile communications system authentication features described herein can be implemented in a variety of communications networks requiring authentication between communication entities. FIG. 1 is a block diagram of an exemplary communicating network entities involved in authentication. An exemplary mobile telecommunications system for purposes of explaining embodiments of the invention is the Universal Mobile Telecommunications System (UMTS), which is a third Generation (3G) mobile system configured to implement broadband multi-media mobile telecommunications technology.

In order for a subscriber's user equipment (UE, or mobile station) to establish a communication session with a network element, the user equipment UE performs an authentication and key agreement with the network element. An exemplary security mechanism is the UMTS Authentication and Key Agreement (AKA), which implements authentication and key agreement features for the UMTS network. AKA achieves mutual authentication between the user and the network using knowledge of a secret key K which is shared between and available only to a user's subscriber identity module (SIM) at the mobile station (user equipment) and an authentication center in the user's home network. A SIM employed in the UMTS network may be referred to as a USIM, wherein the USIM is configured to perform authentication and key agreement processes in the UMTS network. The UMTS authentication and key agreement process is described in more detail in reference to FIGS. 1-3.

The core network of a UMTS comprises a Mobile services Switching Center (MSC) which serves as the interface between the mobile network and external fixed circuit switched telephone networks such as the PSTN. The MSC is configured to route calls from the external networks to individual mobile stations and perform the switching and signaling functions for mobile stations located in the geographical area identified for the MSC.

The core network further comprises a Home Location Register (HLR), a Visitor Location Register (VLR), and an Authentication Center (AuC). The HLR is configured to store data related to each subscriber as provided by the mobile network. The Visitor Location Register (VLR) is implemented in connection with the MSC, wherein the VLR stores information related to each mobile station that roams into the geographical area served by the MSC. As a subscriber registers with different networks, the information in that subscriber's HLR is copied to the VLR in each visited network and discarded when the subscriber leaves the network. Thus, the information stored by the VLR is substantially the same information as that stored by the HLR.

With reference to FIG. 1, a simplified version of this UMTS network communication is illustrated. A local switching center 180 of a serving network performs mutual authentication with a mobile station or user equipment (UE) 160. The local switching center 180 may be a MSC with access to a VLR, and an authentication center 182 has access to the HLR for the user equipment 160. Each UE 160 comprises mobile equipment (ME) (e.g., a cell phone handset) and a UMTS Subscriber Identity Module (USIM). The USIM is stored in a removable secure integrated circuit (IC) card (USIM integrated circuit chip, or UICC) 162 which communicates with the ME, including a processor 164, to provide a subscriber with access to network services. The UICC is sometimes referred to as a SIM card or a smart card. The USIM stores subscriber identity and subscription related information, including a secret key K, performs mutual authentication functions with the communications network, provides security functions, and stores elements such as an International Subscriber Identity (IMSI), preferred language, IC card identification, and cryptographic keys.

The local switching center 180 communicates with an authentication center (AuC) 182 to obtain authentication data specific to the UE 160 to be used for mutual authentication between the local switching center 180 and the UE 160. The communication entities 180, 160 authenticate the identity of each other by demonstrating knowledge of the secret key K.

The AKA described herein for UMTS comprises a challenge/response protocol substantially similar to the GSM subscriber authentication and key establishment protocol combined with a sequence number-based one-pass protocol for network authentication derived from ISO/IEC 9798-4. FIG. 1 and FIGS. 2A-C illustrate the authentication data transmitted between the AuC 182, local switching center 180, and user equipment 160 for mutual authentication between the local switching center 180 and the user equipment 160.

According to the UMTS authentication and key agreement protocol, the local switching center 180 of the network serving the mobile subscriber's user equipment 160 requests authentication data from the AuC 182 in the subscriber's home network. The AuC 182 stores or accesses a secret key K 190*a* designated for the user equipment 160. The secure IC 162 at the user equipment 160 also stores the secret key K 190*b*. In response to the authentication request, the AuC 182 generates one or more authentication vectors using the secret key K 190*a*. FIG. 2A is a block illustration of an exemplary authentication vector 300 generated by the AuC 182. Each authentication vector comprises the following authentication data fields: a challenge value RAND 302, typically random or pseudo-random, a cipher key CK 304, an integrity key IK 306, an authentication token AUTN 308, and an expected response XRES 310. Each authentication token AUTN 308 includes a sequence number SQN 312, an authentication management field AMF 314, and a message authentication code MAC 316. The AuC 182 computes the message authentication code MAC 316, expected response XRES 310, cipher key CK 304, and integrity key IK 306 using the secret key K 190a and one or more of authentication management field AMF 314, the sequence number SQN 312, and the random challenge RAND 302. The AuC 182 sends the one or more generated authentication vectors 300 to the local switching center 180, which stores the authentication vectors such that the local switching center 180 can authenticate itself to the user equipment 160 and confirm the user equipment 160 is authorized to communicate in the network.

When the local switching center 180 initiates an authentication and key agreement for user equipment requesting network access, it selects one of the authentication vectors AV 300 received from the authentication center 182 and sends an authentication challenge, comprising a portion of the authentication vector, to the secure IC 162 at the user equipment 160. FIG. 2B illustrates an exemplary authentication challenge 320, comprising the value RAND 302 and authentication token AUTN 308, to the secure IC 162 at the user equipment UE 160.

The user equipment 160 uses the authentication challenge 320 to determine whether the local switching center 180 is a valid communications server, and the user equipment 160 generates and sends an authentication response to the local switching center 180 to confirm its identity. An exemplary authentication and key agreement process 400 performed at the secure IC 162 is illustrated in FIG. 3, wherein the process begins in a step 402 and proceeds to a step 404 wherein the secure IC 404 receives the authentication token AUTN 308 and value RAND 302. In a step 406, the secure IC 162 generates or computes a message authentication code XMAC based on the random challenge RAND 302, sequence number SQN 312, and authentication management field AMF 314. In a step 408, the secure IC 162 compares the generated XMAC with the received MAC 316 to authenticate the identity of the local switching center 180. If the parameters do not match, the secure IC 162 terminates the authentication in a step 410 and ends the authentication procedure in a step 412.

If the secure IC 162 determines in step 408 that the generated XMAC matches the received MAC 316, the secure IC 162 generates a response RES 326, a ciphering key CK, and an integrity key IK using the random challenge RAND 302 and secret key K 190b in step 414. The user equipment 160 transmits an authentication response 324, including the generated response RES 326, to the local switching center 180 in step 416, wherein an exemplary authentication response 324 is illustrated in FIG. 2C. The authentication and key agreement process 400 ends in step 412. Typically, the generated keys CK and IK are sent to the user's mobile equipment ME for performing data encryption during the communication.

Referring again to FIG. 1, the local switching center 180 compares the response RES 326 generated by the secure IC 162 with the expected response XRES 310 in the selected authentication vector 300. If the two parameters match, then the local switching center 180 considers the authentication and key agreement exchange to be successfully completed. Thus, the local switching center 180 and the user equipment 160 mutually authenticate their identities using knowledge of the shared secret key K 190a, b, and agree on keys CK and IK for secure communications, wherein the local switching center 180 stores the keys CK 304 and IK 306 for secure communications with the user equipment 160.

A more detailed description of the standardized authentication procedures used in a UMTS network are described in the 3$^{rd}$ Generation Partnership Project, Technical Specification Group Services and System Aspects, 3G Security, Security Architecture (Release 6), 3GPP TS 33.102, V6.3.0 (December 2004), herein incorporated by reference in its entirety. In certain networks, a generic bootstrapping architecture (GBA) provides a mechanism to bootstrap application security from the AKA mechanism to authenticate a subscriber (user equipment) and establish keys for communication between a subscriber and a network function, such as an e-commerce provider.

Some of the authentication data parameters used in UMTS authentication and key agreement are proprietary and not standardized, that is, some authentication data parameters are not used in a standard manner in every network and may be used by different network operators to communicate with the user equipment in a different manner. The use of the authentication management field (AMF), for example, may be defined differently by each network operator.

Because the number of authentication data parameters used in network authentication and key agreement processes are finite, it would be advantageous to manipulate one or more of the authentication data parameters, specifically the proprietary authentication data parameters, to communicate additional information to user equipment in a standard manner. For example, where each operator defines the use of the AMF differently, the mobile equipment cannot be configured to respond to any particular value of the AMF. However, if the AMF can be used in a standardized manner, mobile equipment may be designed to interpret the AMF accordingly and respond to the interpreted value of the AMF.

There is therefore a need in the art for a method of using proprietary authentication data in a standard way across substantially all networks.

SUMMARY

In one aspect, the invention includes a method of instructing a subscriber identity module in a cellular communications network to process authentication information in a predefined manner. The method includes receiving authentication data at the subscriber identity module, the authentication data comprising a first message authentication code (MAC) and an authentication management field (AMF). The method continues by computing a first expected MAC using at least a portion of the authentication data and comparing the first expected MAC to the first received MAC. A second expected MAC is computed, computing a second expected MAC, and the second expected MAC is compared to the first received MAC. At least a portion of the AMF is processed in a predefined manner when the second expected MAC and the first received MAC are the same.

In another aspect, a method of instructing a subscriber identity module in a mobile communications network to process authentication information in a predefined manner comprises receiving one or more authentication data fields at the subscriber identity module, the authentication data fields comprising a first message authentication code (MAC) and an authentication management field (AMF). The method additionally comprises generating, in the subscriber identity module, a second MAC using one or more received authentication data fields, and comparing the second MAC to the first MAC. The method further comprises generating, in the subscriber identity module, a third MAC when the second MAC differs from the first MAC, wherein the third MAC is generated based on one or more received authentication data fields. The method continues by determining whether the first MAC is the same as the third MAC, and processing at least a portion of the AMF in a predefined manner when the first MAC is the same as the third MAC.

In another aspect of the invention, a subscriber identity module for a mobile station of a communications network is configured to process a plurality of authentication data parameters according to an authentication algorithm and generate first and second authentication parameters. The subscriber identity module is further configured to determine whether the first generated authentication parameter matches a first received authentication parameter, and whether the first received authentication parameter matches the second generated authentication parameter. The module is further configured to process a second received authentication parameter according to a predefined process when the first received authentication parameter matches the second generated authentication parameter.

In another aspect, a cellular communications network includes a mobile station comprising a subscriber identity module configured to perform a predefined authentication algorithm using at least one authentication data parameter. The network further includes a network element configured to generate a plurality of authentication data parameters for mutual authentication with the mobile station according to the predefined authentication algorithm. The plurality of authentication data parameters includes at least a first authentication data parameter and a second authentication data parameter, and the subscriber identity module is configured to process the second authentication data parameter in a defined manner in response to a determination that the first authentication data parameter is different from a first authentication data parameter generated by the mobile station and equivalent to a second authentication data parameter generated by the mobile station.

In another aspect, a method of processing a received MAC value in a mutual authentication system in which first and second communicating entities each authenticate the other is provided. The authentication comprises generating a message authentication code (MAC) at the first entity having a value dependent on a secret key shared by the first and second entities. The MAC is received by the second entity with a plurality of additional data fields. The method of processing the received MAC value at the second entity includes generating a plurality of MAC values, comparing each of the plurality of MAC values to the received MAC value, and processing at least a portion of one or more of the additional received data fields according to the results of the comparing.

In yet another aspect of the invention, a method of a communicating entity authenticating itself to a receiving entity in a communication network in which first and second communicating entities each authenticate the other is provided. The method includes transmitting a message authentication code with at least a first additional data field. The message authentication code authenticates the communicating entity and defines receiving entity interpretation of the additional data field.

Another aspect of the invention is used in a communication network in which first and second communicating entities each authenticate the other, and wherein the authentication comprises generating a message authentication code (MAC) at the first entity having a value dependent on a secret key shared by the first and second entities. In such a network, a method of authenticating a first communicating entity at a second communicating entity comprises receiving a message authentication code and at least one additional data field, confirming first entity possession of the secret key based on the content of the message authentication code, and interpreting the additional data field based on the content of the message authentication code.

In another aspect, a mutual authentication system is provided for instructing a subscriber identity module in a communications network to process authentication information in a predefined manner. The system comprises means for sending authentication data to a mobile station, the authentication data comprising a first message authentication code (MAC) and an authentication management field (AMF) and means for receiving the authentication data at the mobile station. The system also comprises means for computing a first expected MAC using at least a portion of the authentication data, means for comparing the first expected MAC to the first received MAC, means for computing a second expected MAC, means for comparing the second expected MAC to the first received MAC, and means for processing at least a portion of the AMF in a predefined manner when the second expected MAC and the first received MAC are the same.

DETAILED DESCRIPTION OF CERTAIN EMBODIMENTS

In one embodiment, the authentication and key agreement described above is bootstrapped for application security to authenticate a subscriber. Thus, a Generic Bootstrapping Architecture (GBA) based on AKA protocol is defined, and is described in detail in 3GPP TS 33.220 V7.0.0, Generic Authentication Architecture (GAA), Generic Bootstrapping Architecture (June, 2005), herein incorporated by reference in its entirety. The GBA provides additional security for communications involving exchange of sensitive information, such as banking or credit information, wherein the established authentication procedure is used to generate additional or application specific keys for these secure communications.

Figure 1:
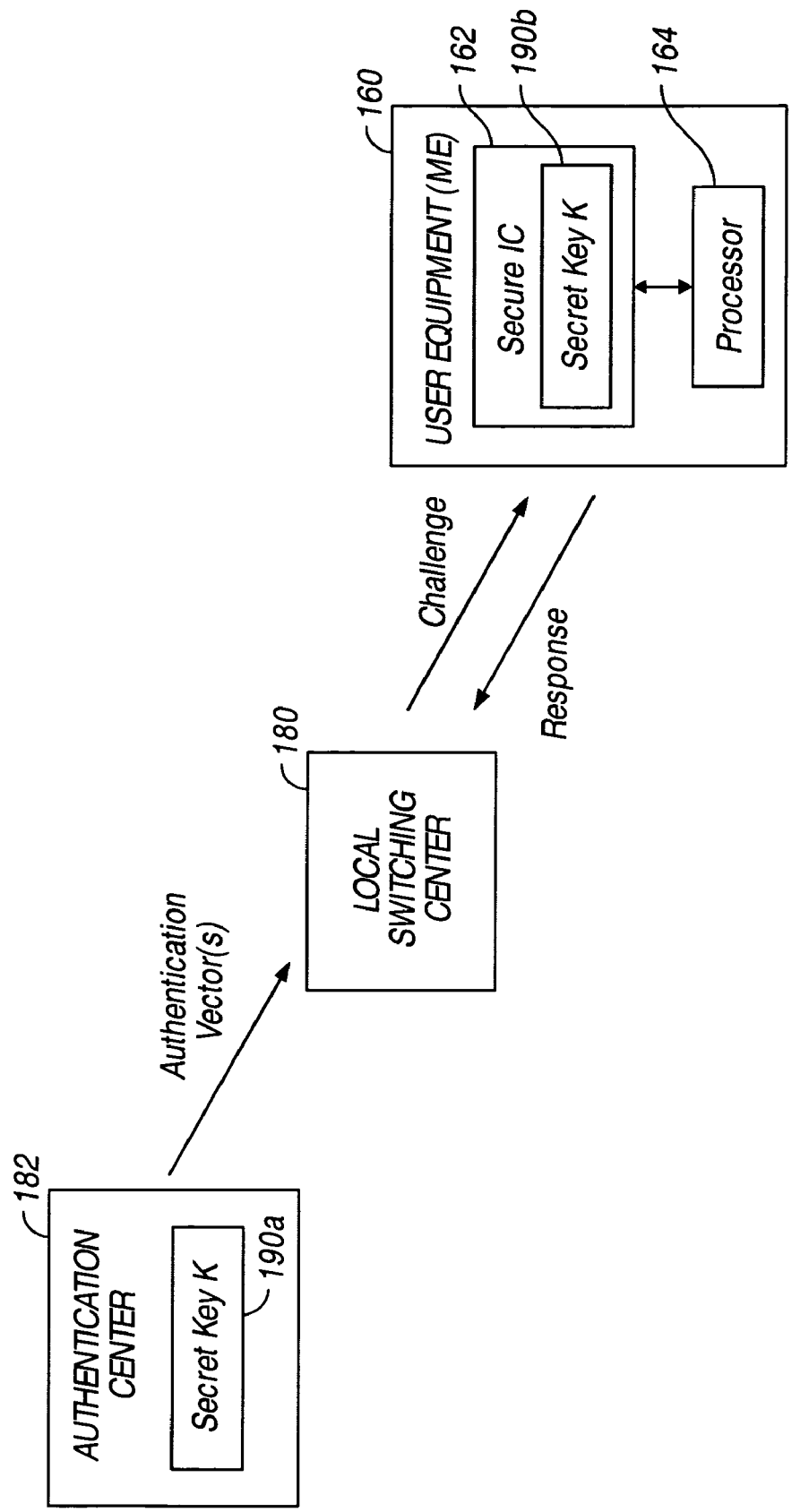
FIG. 1 is a block diagram of one embodiment of communicating UMTS network entities performing mutual authentication.
Figure 4:
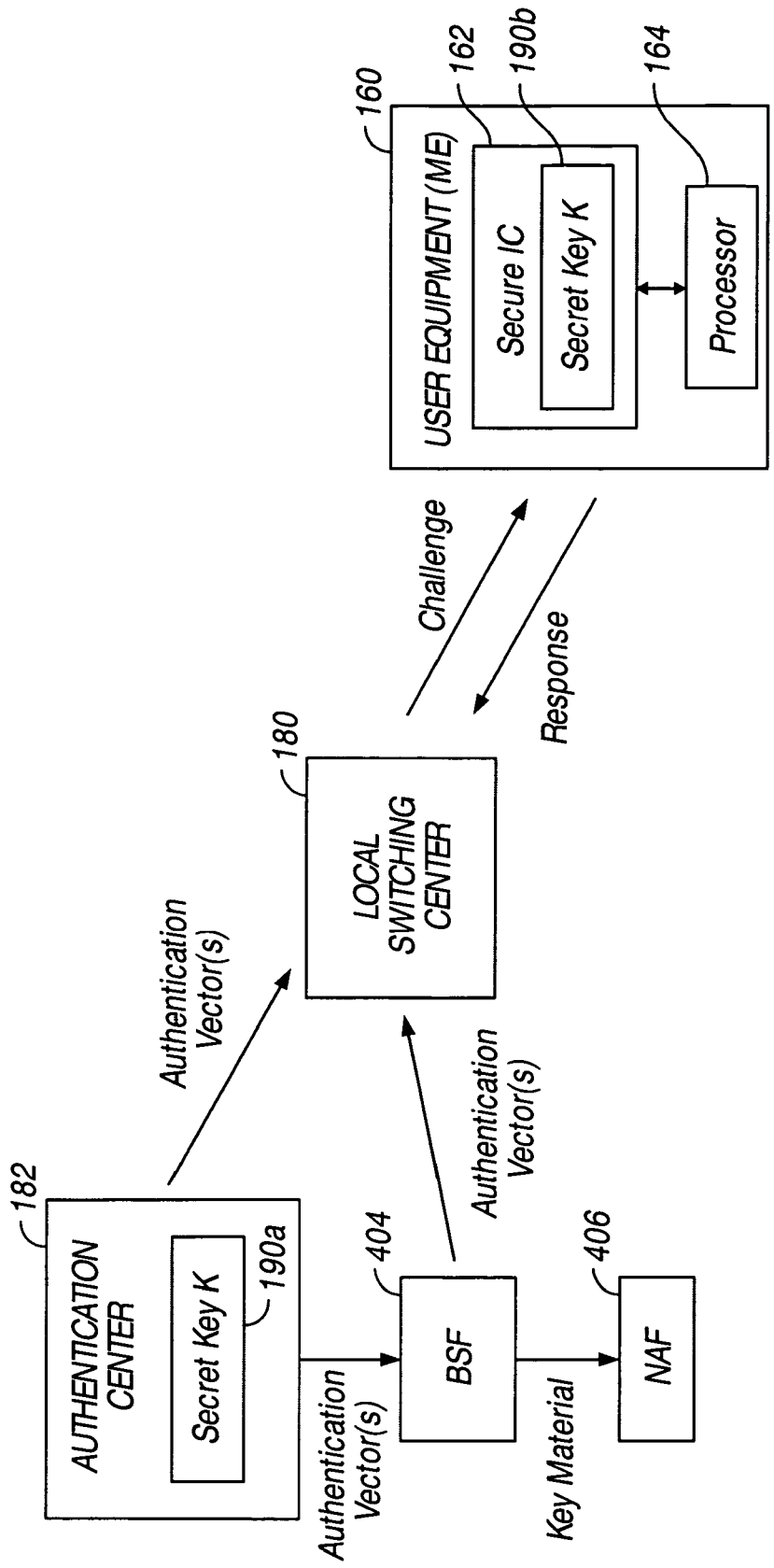
FIG. 4 is a block diagram of one embodiment of communicating network entities performing a bootstrapped mutual authentication.

FIG. 4 is a block diagram of one embodiment of communicating network entities performing a bootstrapped mutual authentication, similar to the communicating network entities of FIG. 1. According to the GBA, the subscriber's user equipment UE 160 mutually authenticates with a generic Bootstrapping Server Function (BSF) 404 at a server in the user's home network using the authentication and key agreement AKA protocol, wherein the BSF communicates with the authentication center AuC 182 to obtain the authentication vectors. The UE 160 and the BSF 404 agree on a session key Ks that is used to derive key material Ks_NAF used for communication between the user equipment UE 160 and a Network Application Function (NAF) 406. The session key Ks is computed using the results of AKA (e.g., CK and IK) and stored at each the UE 160 and the BSF in reference to a bootstrapping transaction identifier (B-TID). The NAF 406 is employed at a server for a specific application, for example, an application desiring more security than provided by a standard authentication used for the radio network, such as a banking service provider.

The UE 160 requests service from the NAF 406 by sending its bootstrapping transaction identifier B-TID, and the NAF 406 sends an authentication request to the BSF 404 using the B-TID and its own identification name. In response to receipt of the authentication request from the NAF 406, the BSF 404 computes the key material Ks_NAF based on the stored key Ks referenced by the B-TID, and sends the key material Ks_NAF to the NAF 406. The NAF 406 then responds to the UE's 160 application request with an application response, and the UE 160 and the NAF 406 can then communicate using the key material Ks_NAF.

Embodiments of the network architecture wherein the GBA-specific functions are carried out in the mobile equipment ME, such as where the key material Ks is generated at the mobile equipment ME, can be referred to as GBA_ME, wherein the UICC is unaware of the GBA. Another embodiment of the GBA includes UICC-based enhancements and may be referred to as GBA_U, wherein the GBA-specific functions are divided between the mobile equipment ME and the UICC. In the GBA_U, for example, the cipher key CK and integrity key IK generated according to AKA may be retained on the UICC in confidence and not communicated to the mobile equipment ME, and the UICC generates the bootstrapping key Ks.

Figure 3:
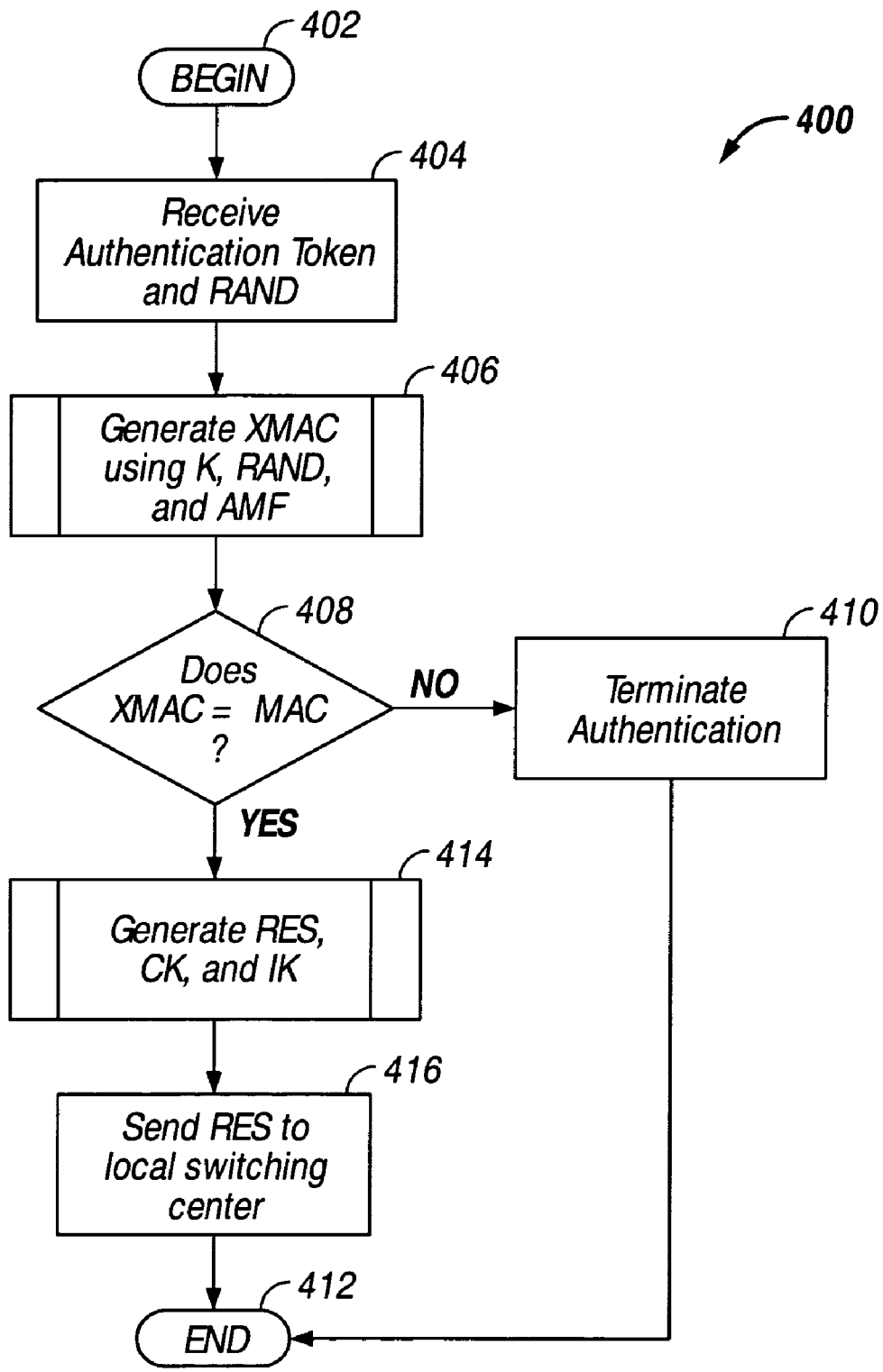
FIG. 3 is a process flow diagram illustrating one embodiment of an UMTS authentication and key agreement process performed at a user's equipment.

As discussed above, authentication and key agreement AKA employs a plurality of authentication fields or parameters, including the message authentication code MAC 316 and the authentication management field AMF 314 (FIG. 3B). Each of these authentication parameters comprises a plurality of bits of data, for example. As explained further below, the present invention provides a way for a network operator to use the AMF field in a standardized way to communicate with mobile units and to cause the mobile units to perform particular defined functions.

Figure 5:
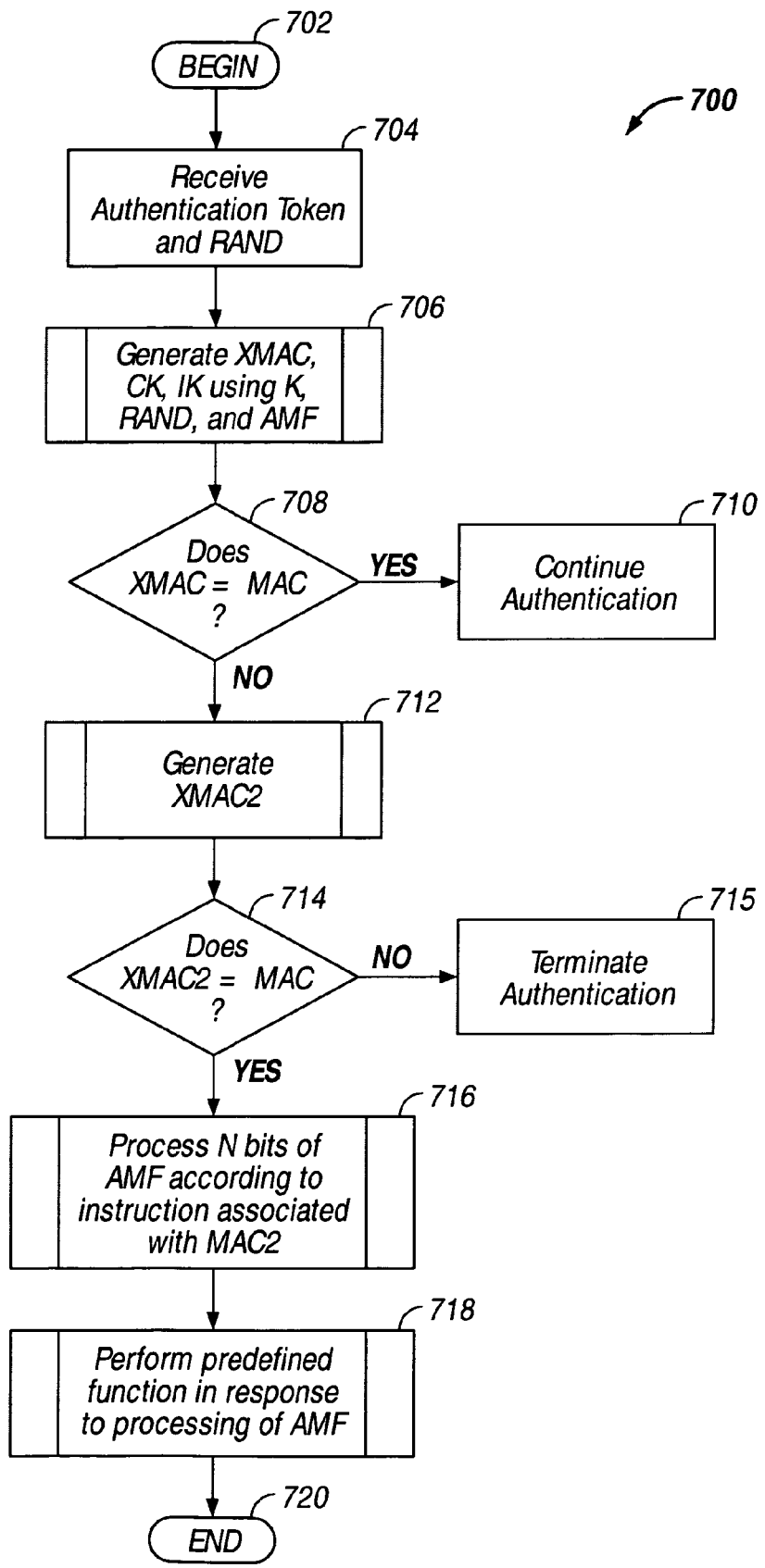
FIG. 5 is a process flow diagram illustrating one embodiment of a method of instructing a subscriber identity module in a cellular communications network to process authentication information in a predefined manner.

FIG. 5 is a process flow diagram illustrating one embodiment of a method 700 of instructing a subscriber's secure IC 162 in a mobile communications network to process authentication information in a predefined manner. The method 700 comprises some steps already described in reference to FIG. 3, and these steps or processes are therefore not described again here in detail. The method 700 begins in a step 702, and proceeds to a step 704 wherein the secure IC 162 receives an authentication token AUTN comprising an authentication management field AMF and message authentication code MAC, and a random challenge RAND. The method 700 proceeds to a step 706, wherein the secure IC 162 computes or generates a message authentication code XMAC. In a step 708, the secure IC 162 determines whether XMAC is equivalent to the MAC received in the authentication token AUTN, similar to step 508 in FIG. 5. If the secure IC 162 determines in step 706 that XMAC=MAC, then the method 700 proceeds to a step 710 wherein the secure IC 162 proceeds with the authentication procedure as described in reference to FIG. 3.

If the secure IC 162 determines in step 708 that XMAC≠MAC, the method 700 proceeds to a step 712, wherein the secure IC 162 generates at least a second message authentication code XMAC2. The second message authentication code XMAC2 may be, for example, a hash function of XMAC, the cipher key CK, and the integrity key IK (XMAC2 (XMAC, CK, IK)), for example, wherein step 706 may include generating the cipher and integrity keys CK, IK as discussed in reference to step 506 of FIG. 5. As will be appreciated by those skilled in the art, the second message authentication code XMAC2 may be determined based on one or a combination of the authentication data received as part of the authentication token AUTN, the random challenge RAND, and the secret key K. In certain embodiments, the secure IC 162 generates the second message authentication code XMAC2 regardless of whether the received authentication code MAC is equivalent to the first generated message authentication code XMAC.

Following generation of the second message authentication code XMAC2 in step 712, the secure IC 162 determines whether the received MAC=XMAC2 in a step 714. If the secure IC 162 determines in step 714 that the received MAC≠XMAC2, then the authentication process is terminated in a step 715. If the secure IC 162 determines in step 714 that the received MAC=XMAC2, the secure IC 162 processes N bits of the authentication management field AMF according to a predefined protocol, and may instruct the mobile terminal that this AMF is standardized and may be interpreted.

The AMF can thus be used by a service provider to provide standardized instructions to the mobile unit. The mobile unit is effectively informed that the network operator is using the AMF for standardized instructions by the fact that the operator is using a particular MAC value. The content of the AMF may, for example, cause the mobile unit retain the results of the AKA exchange on the UICC. A different AMF content may signify that the generated key only be used in a specific algorithm such as the UMTS encryption algorithm UEA1, for example. The AMF content may also signify that the encryption key be derived from a hash of CK and other values to provide some key separation.

Thus, in communication sessions where the security of an encryption key is of high importance, the method described in reference to FIG. 5 can be used to maintain an encryption key at the secure IC 162 rather than exposing the key to the non-secure mobile equipment ME. An example of a communication session where such security would be beneficial is a broadcast communication to a group of subscribers. Where a group of mobile subscribers have subscribed to an information broadcast service, such as a news or sports information provider, enhanced security for encryption keys is important to prevent non-subscribers from accessing the broadcast service without paying the fee.

Thus, in reference to FIG. 1, when a group member's user equipment UE 160 requests receipt of a broadcast communication, the AuC 182 selects MAC2 and an authentication management field AMF2 for inclusion in the authentication vector sent to the local switching exchange 180 for use in the authentication challenge sent to the user equipment UE 160. The AuC has knowledge of the capabilities of the secure IC 162, specifically whether the secure IC 162 is configured to process the modified MAC. Accordingly, with such knowledge, the AuC selects MAC2 and AMF2 instead of a normal MAC and AMF. The authentication management field AMF2, when processed at the secure IC 162 in response to receipt of MAC2, instructs the secure IC 162 to maintain an encryption key at the secure IC 162 in confidence. Thus, a group member's secure IC 162 may receive a group encryption key Kg which is encrypted by the subscriber's cipher key CK. The secure IC 162 decrypts and stores the group key Kg. The group key Kg is used to generate a broadcast encryption key Kb for encryption/decryption of communications with the broadcast service provider. The broadcast encryption key Kb is derived from the group encryption key Kg and some other data. To help maintain the security of the group encryption key Kg, the ciphering key CK is retained on the secure IC 162 in confidence in response to receipt of MAC2 and AMF2, along with the group encryption key Kg, and only the broadcast encryption key Kb is provided to the mobile equipment ME.

Figure 2C:
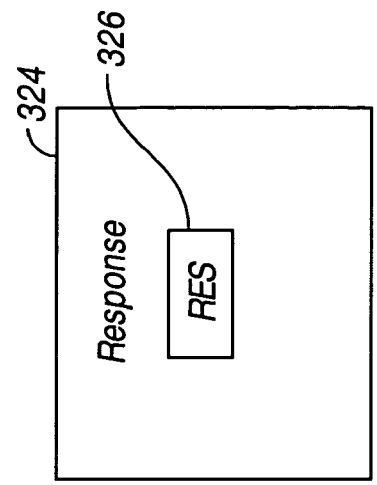
FIG. 2C is a block illustration of one embodiment of the authentication response of FIG. 1.
Figure 2B:
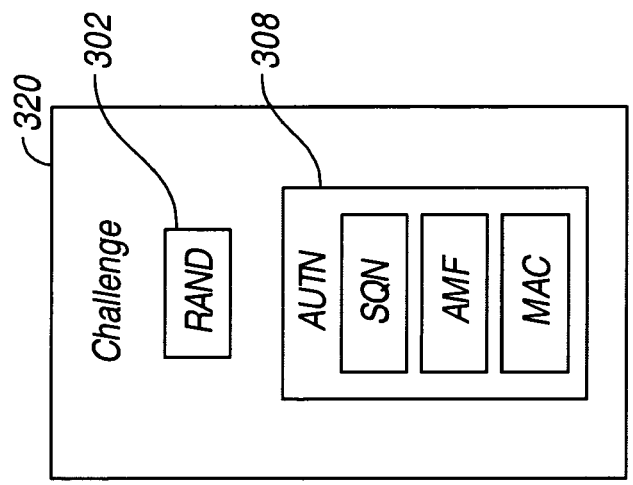
FIG. 2B is a block illustration of one embodiment of the authentication challenge of FIG. 1.
Figure 2A:
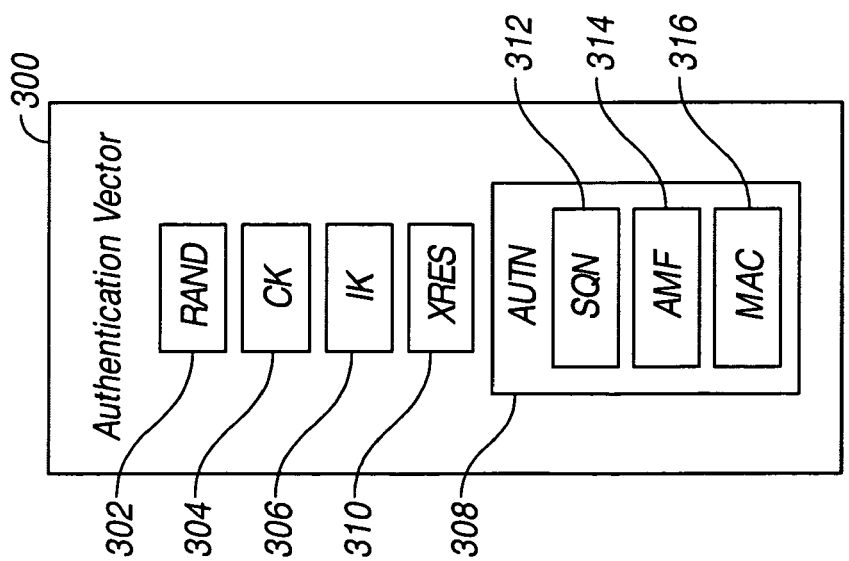
FIG. 2A is a block illustration of one embodiment of the authentication vector (AV) of FIG. 1.
Figure 6:
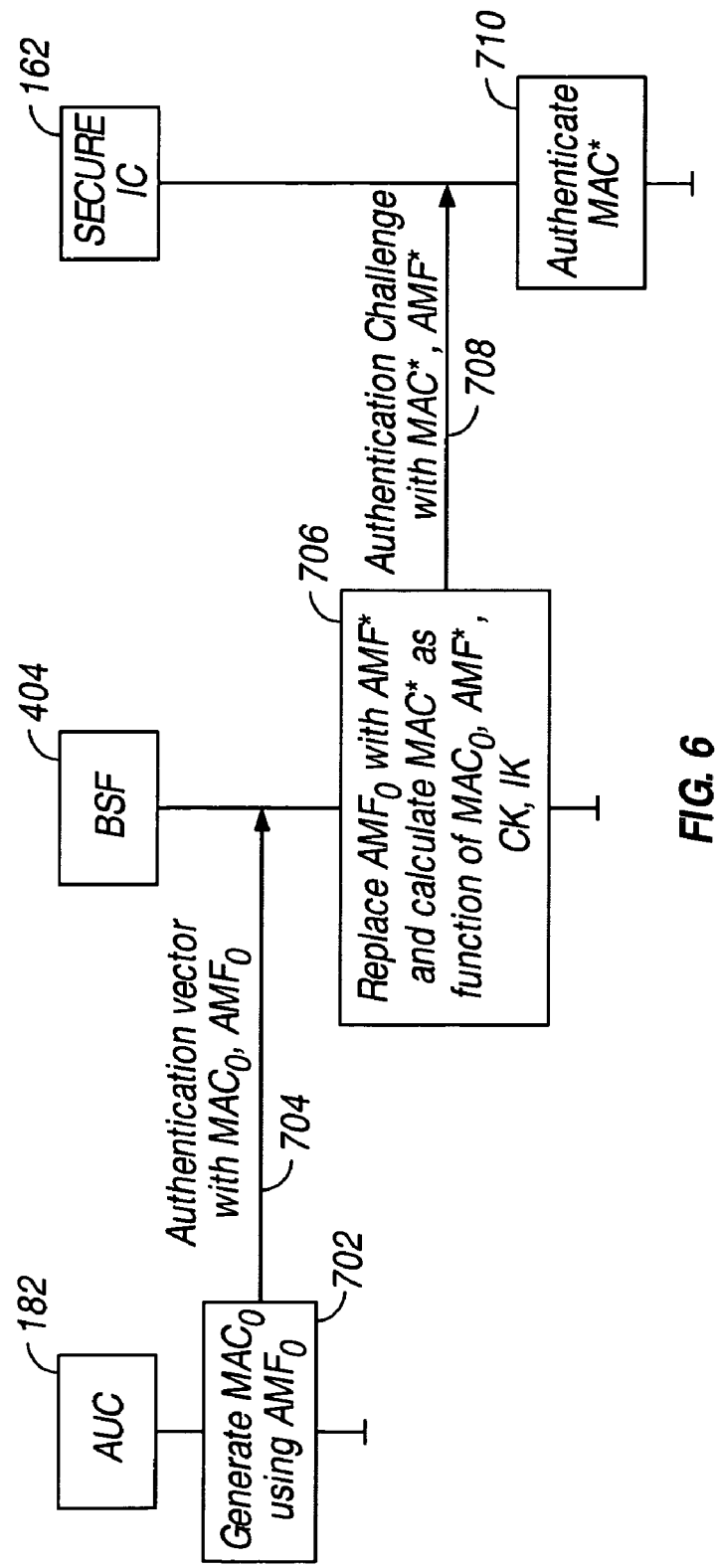
FIG. 6 is a signal flow diagram illustrating one embodiment of a method of using a designated authentication management field AMF.

In another embodiment of an authentication management scheme, the authentication center AuC 182 controls whether a bootstrapping function or another network entity has the privilege to change the AMF and use the AMF to exert control over a mobile station. For example, when a mobile station roams into a network outside the subscriber's home network, the authentication center AuC 182 determines whether the AMF used for authentication is identified by the authentication center or the serving network. Where the serving network is trusted by the authentication center AuC, then the AuC may allow the serving network to modify the AMF by selecting a predefined or designated authentication management field AMF. However, if the serving network is not trusted by the authentication center AuC, then the AuC generates and sends an authentication vector as discussed in reference to FIGS. 1 and 2. FIG. 6 is a signal flow diagram illustrating one embodiment of a method of using a distinguished authentication management field AMF. The authentication center AuC 182 uses a distinguished authentication management field $AMF_0$ to generate the message authentication code $MAC_0$ in a step 702. For example, the distinguished authentication management field $AMF_0$ may have an all-zero value. If the authentication center AuC 182 does not want the bootstrapping function BSF 404 to replace the AMF but still wants to use $AMF_0$, the AuC 182 replaces $AMF_0$ with a different authentication management field AMF*, and generates a predefined message authentication code MAC* as a function of $MAC_0$, AMF*, CK, IK.

Where the GBA is used as illustrated in FIG. 4, the authentication center AuC 182 sends an authentication vector including $MAC_0$ and $AMF_0$ to the bootstrapping function BSF 404 in a step 704. The BSF 404 replaces $AMF_0$ with AMF* and generates a predefined message authentication code MAC* as a function of $MAC_0$, AMF*, CK, IK in a step 706. In a step 708, the BSF 404 sends an authentication challenge, including MAC* and AMF*, to the secure IC 162 at the mobile station. The secure IC 162 at the mobile station then performs an authentication process using MAC* in a step 710. However, if the authentication center AuC 182 wants to prevent the bootstrapping function BSF 404 from changing the authentication management field AMF due to trust levels, and still wants to use $AMF_0$, the authentication vector received at the BSF 404 from the AuC 182 includes AMF*, and the BSF 404 passes the authentication challenge including MAC* and AMF* to the mobile station unchanged.

Figure 7:
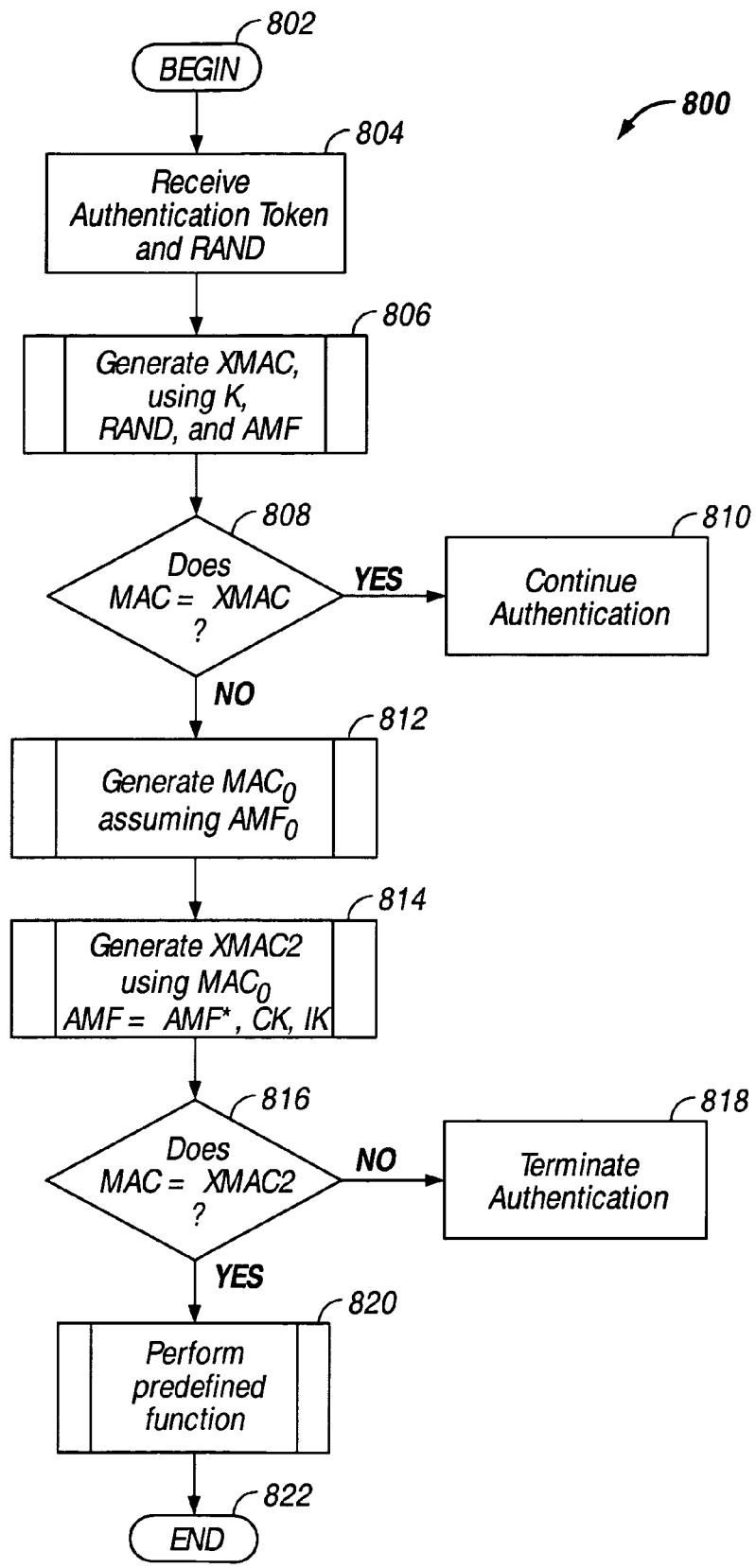
FIG. 7 is a process flow diagram illustrating one embodiment of a method of processing a designated authentication management field AMF at a mobile station's secure IC.

FIG. 7 is a process flow diagram illustrating one embodiment of a method 800 of processing the designated authentication management MAC* at the secure IC 162. The method 800 begins in a step 802, and proceeds to a step 804 wherein the secure IC 162 receives an authentication token AUTN comprising an authentication management field AMF and message authentication code MAC, and a random challenge RAND. The method 800 proceeds to a step 806, wherein the secure IC 162 computes or generates a message authentication code XMAC. In a step 808, the secure IC 162 determines whether XMAC is equivalent to the MAC received in the authentication token AUTN, similar to step 708 in FIG. 5. If the secure IC 162 determines in step 806 that XMAC=MAC, then the method 800 proceeds to a step 810 wherein the secure IC 162 proceeds with the authentication procedure as described in reference to FIG. 3.

If the secure IC 162 determines in step 808 that MAC≠XMAC, the method 800 proceeds to a step 812, wherein the secure IC 162 generates a second message authentication code $MAC_0$ assuming the authentication management field AMF is the distinguished authentication management field $AMF_0$. The secure IC 162 then generates a third message authentication code XMAC2 in a step 814 as XMAC2($MAC_0$, AMF, CK, IK), wherein the received AMF is AMF*. In a step 816, the secure IC 162 determines whether the received MAC=XMAC2. If the secure IC 162 determines in step 816 that MAC≠XMAC2, then the authentication terminates in a step 828. If the secure IC 162 determines in step 816 that the received MAC is equivalent to XMAC2, then the method proceeds to a step 820 wherein the secure IC 162 performs a predefined function, and proceeds to end in step 822. The predefined function performed in step 820 may include one or more of the predefined functions discussed above in reference to step 718 of FIG. 5.

As will be appreciated by those skilled in the art, the above-described systems and methods are directed to only a few specific embodiments, and the invention can be practiced in many ways. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of instructing a subscriber identity module in a cellular communications network to process authentication information, comprising:
   receiving authentication data at the subscriber identity module, said authentication data comprising a first message authentication code (MAC) and an authentication management field (AMF);
   computing a first expected MAC using at least a portion of said authentication data;
   comparing said first expected MAC to said first received MAC;
   computing a second expected MAC;
   comparing said second expected MAC to said first received MAC; and
   processing at least a portion of said AMF in a predefined manner when said second expected MAC and said first received MAC are the same.

2. The method of claim 1, wherein processing said AMF generates an instruction to the subscriber identity module to retain an authentication result.

3. The method of claim 2, wherein said authentication result comprises at least one of a ciphering key and an integrity key.

4. The method of claim 1, wherein processing said AMF comprises generating an instruction to the subscriber identity module to perform key separation among encryption algorithms.

5. The method of claim 1, wherein the first expected MAC is used in conjunction with one or more parameters to generate the second expected MAC in the event that the said first expected MAC to said first received MAC step determines the first expected MAC is different than the first received MAC.

6. A method of instructing a subscriber identity module in a mobile communications network to process authentication information in a predefined manner, comprising:
   receiving one or more authentication data fields at the subscriber identity module, said authentication data fields comprising a first message authentication code (MAC) and an authentication management field (AMF);
   generating, in the subscriber identity module, a second MAC using one or more received authentication data fields, and
   comparing said second MAC to said first MAC;
   generating, in the subscriber identity module, a third MAC when said second MAC differs from said first MAC, wherein said third MAC is generated based on one or more received authentication data fields;
   determining whether said first MAC is the same as said third MAC; and
   processing at least a portion of said AMF in a predefined manner when said first MAC is the same as said third MAC.

7. The method of claim 6, wherein said third MAC is generated using a distinguished authentication data field.

8. The method of claim 7, wherein processing at least a portion of said AMF generates an instruction to the subscriber identity module to retain an authentication result at the subscriber identity module in confidence.

9. A mutual authentication system for instructing a subscriber identity module in a communications network to process authentication information, comprising:
   means for sending authentication data to a mobile station, said authentication data comprising a first message authentication code (MAC) and an authentication management field (AMF);
   means for receiving said authentication data at said mobile station;
   means for computing a first expected MAC using at least a portion of said authentication data;
   means for comparing said first expected MAC to said first received MAC;
   means for computing a second expected MAC;
   means for comparing said second expected MAC to said first received MAC; and
   means for processing at least a portion of said AMF in a predefined manner when said second expected MAC and said first received MAC are the same.

10. The system of claim 9, wherein said means for processing said AMF is configured to generate an instruction to the subscriber identity module to retain an authentication result.

11. The system of claim 10, wherein said authentication result comprises at least one of a ciphering key and an integrity key.

12. The system of claim 9, wherein said means for processing said AMF comprises means for generating an instruction to the subscriber identity module to perform key separation among encryption algorithms.

13. A subscriber identity module in a mobile communications network configured to process authentication information in a predefined manner, comprising:
   means for receiving one or more authentication data fields at the subscriber identity module, said authentication data fields comprising a first message authentication code (MAC) and an authentication management field (AMF);
   means for generating, in the subscriber identity module, a second MAC using one or more received authentication data fields, and
   means for comparing said second MAC to said first MAC;
   means for generating, in the subscriber identity module, a third MAC when said second MAC differs from said first MAC, wherein said third MAC is generated based on one or more received authentication data fields;
   means for determining whether said first MAC is the same as said third MAC; and means for processing at least a portion of said AMF in a predefined manner when said first MAC is the same as said third MAC.

14. A non-transitory computer-readable storage medium containing instructions stored thereon, which, when executed by a mutual authentication system for instructing a subscriber identity module in a communications network to process authentication information, causes the mutual authentication system to perform operations, the instructions comprising:
- program code to send authentication data to a mobile station, said authentication data comprising a first message authentication code (MAC) and an authentication management field (AMF);
- program code to receive said authentication data at said mobile station;
- program code to compute a first expected MAC using at least a portion of said authentication data;
- program code to compare said first expected MAC to said first received MAC program code to compute a second expected MAC;
- program code to compare said second expected MAC to said first received MAC; and
- program code to process at least a portion of said AMF in a predefined manner when said second expected MAC and said first received MAC are the same.

15. A non-transitory computer-readable storage medium containing instructions stored thereon, which, when executed by a subscriber identity module in a mobile communications network configured to process authentication information in a predefined manner, cause the subscriber identity module to perform operations, the instructions comprising:
- program code to receive one or more authentication data fields at the subscriber identity module, said authentication data fields comprising a first message authentication code (MAC) and an authentication management field (AMF);
- program code to generate, in the subscriber identity module, a second MAC using one or more received authentication data fields, and
- program code to compare said second MAC to said first MAC;
- program code to generate, in the subscriber identity module, a third MAC when said second MAC differs from said first MAC, wherein said third MAC is generated based on one or more received authentication data fields; and
- program code to determine whether said first MAC is the same as said third MAC; and
- program code to process at least a portion of said AMF in a predefined manner when said first MAC is the same as said third MAC.

* * * * *